UNITED STATES PATENT OFFICE.

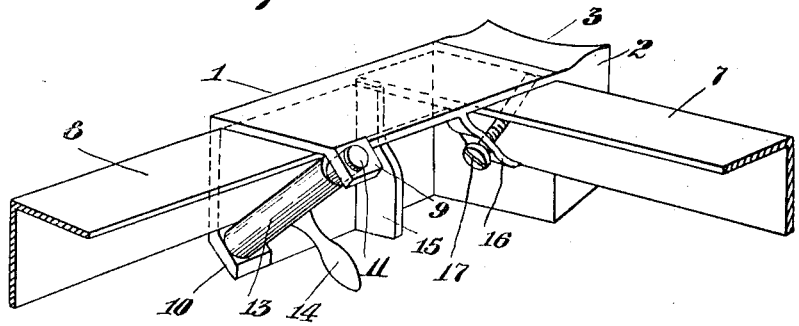
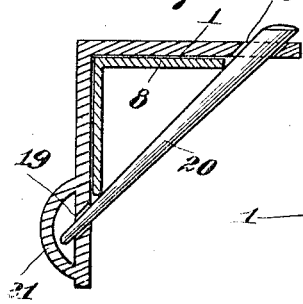
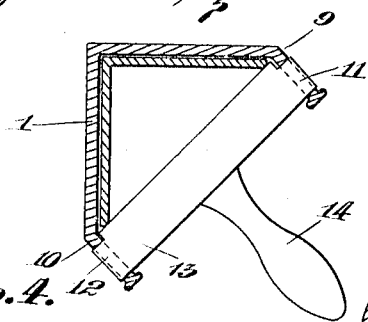
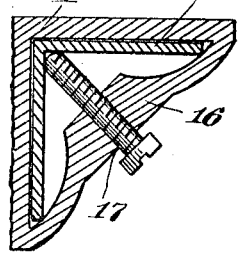
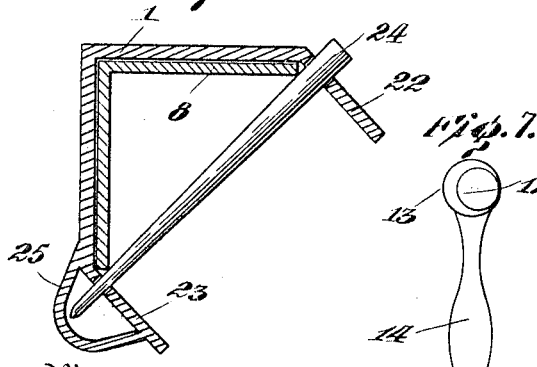
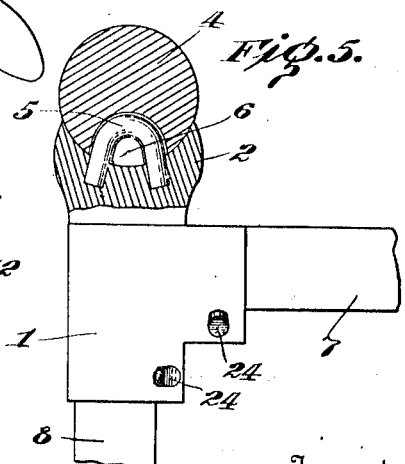

RADU TATTU, OF NEW YORK, N. Y.

JOINT.

1,055,100.

Specification of Letters Patent.

Patented Mar. 4, 1913.

Application filed July 25, 1912. Serial No. 711,428.

*To all whom it may concern:*

Be it known that I, RADU TATTU, a citizen of the United States, and resident of the city of New York, in the county of Kings and State of New York, have invented a certain new and useful Joint, of which the following is a specification.

My invention relates to improvements in joints, and the object of my invention is to provide a simple and effective device for the purpose of joining bars and the like, and is particularly adapted for use in joining bars and angle members to form the corners of bedsteads and the like.

My device is illustrated in the accompanying drawings in which—

Figure 1 is a view of a corner constructed with two forms of the device, parts being shown in dotted lines. Fig. 2 is a view of a modification of my device, showing the use of a pin. Fig. 3 is a view of a modification of the same, showing the clamping screw. Fig. 4 is a view of another modification of the device showing the clamping pin. Fig. 5 is a plan view of the device applied to a bedstead corner with the post and adjacent parts shown in section. Fig. 6 is an optional form of the device, provided with the eccentric clamping roller. Fig. 7 is an end view of the eccentric roller and handle shown in Fig. 6.

Similar characters refer to similar parts throughout the several views.

For the purpose of joining bars, angle irons and the like to form a corner, where it is desired that said corner shall not be permanent, but that the parts may be firmly secured and held rigid, but capable of being conveniently taken apart, it is desirable to provide means for readily and rigidly setting and securing the parts by unskilled persons. I accomplish this object by my device, which comprises an angle member 1 which, when used in a bedstead has preferably built thereon and integral therewith, an end section 2, which end section may be provided with a concave face section 3 adapted to fit the bedpost 4 and may also carry an anchor bolt 5 of any desired form, to engage the lug 6 formed in the bedpost 4. The rods or angle irons 7 and 8, forming the frame of the bedstead or similar structure, are inserted in the angle member 1 and the object of my device is to secure them therein rigidly but in such manner that they may be readily detached when desired.

In the form of my device illustrated in Figs. 6 and 7 I bend over sections 9 and 10 of the leaves of the angle member 1 in parallelism and cut out of said bent over sections 9 and 10, sockets for the end sections 11 and 12 respectively, of the eccentric roller 13 which is operated by means of a handle 14. In this form of the device the bar or angle iron 8 is inserted in the angle member 1 with its end face resting against the partition 15, the eccentric roller 13 being set in such position as to allow the angle iron 8 to be inserted. When the said angle iron 8 is in position as described, resting in the angle member 1 the handle 14 of the eccentric roller 13 is pressed down, forcing the face of the roller 13 against the angle iron 8 and clamping the same firmly against the inner face of the angle member 1, and will be so held until released by the raising of the handle 14.

In the optional form of my device illustrated in Fig. 3, I provide between the inner faces of the angle member 1 a diagonally set leaf 16 provided with an internally screw threaded aperture to receive the screw 17. In this form of the device the angle iron 7 is inserted in the angle member 1 and the screw 17 is forced down by means of a screw driver against the inner face of the angle iron 7 securely anchoring the said angle iron 7 in its seat.

An optional form of the device is illustrated in Fig. 2, in which the angle member 1 is provided with apertures 18 and 19 adjacent the edge sections of the leaves of the angle iron 8. A tapering pin or wedge 20 is thereupon inserted in said apertures 18 and 19 and driven down, causing the angle iron to be forced up against the inner face of the angle member 1, securely anchoring the parts. In this form of the device I preferably provide a guard section 21 to cover the projecting end section of the pin 20.

In the optional form of my device illustrated in Fig. 4 I provide upon the leaves of the angle member 1, bent over sections 22 and 23, apertured to receive the tapering pin or wedge 24 which is driven down forcing the angle iron 8 against the inner face of the angle member 1, securely anchoring the parts. In this form of the device I preferably provide a guard section 25 to cover the projecting end of the pin 24.

It will thus be apparent that with either form of this device the parts may be readily assembled and anchored in position by an unskilled operator, and may be readily knocked down and reassembled as desired.

Having thus described my invention, what I claim is—

1. In a device of the character described, the combination of an angle member, a bar therein, and a wedging device between the leaves of the angle member, whereby the bar will frictionally engage the angle member.

2. In a device of the character described, a combination of an angle member having two leaves, bent over sections on said leaves, a wedging device between the said bent over sections and means for engaging the said bar by the said wedging device, whereby the bar and angle member are frictionally engaged.

3. In a device of the character described, a combination of an angle member, a bar therein, and a wedging member seated in apertures in the angle member, whereby the parts are frictionally engaged, substantially as shown and described.

Signed at New York, in the county of New York and State of New York, this 20th day of July A. D. 1912.

RADU TATTU.

Witnesses:
JUSTIN P. GALLAND,
L. H. BROWN.